US012802138B2

(12) United States Patent
Moudgal et al.

(10) Patent No.: US 12,802,138 B2
(45) Date of Patent: Nov. 17, 2026

(54) DECENTRALIZED SYSTEMS AND METHODS FOR ENABLING INSTANTANEOUS SETTLEMENT WHILE MAINTAINING TRANSACTION PRIVACY AND ENSURING REGULATORY COMPLIANCE

(71) Applicant: JPMORGAN CHASE BANK, N.A., New York, NY (US)

(72) Inventors: Keerthana Moudgal, Brooklyn, NY (US); Alexandra Prager, Brooklyn, NY (US); Dennis Cristallo, New York, NY (US); Joe Leung, Reigate (GB); Stephanie Lok, New York, NY (US); Ganesh Anantwar, Mumbai (IN); Abhishek Agarwal, Bengaluru (IN); Dylan Paul, Woodmere, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 19/275,427

(22) Filed: Jul. 21, 2025

(65) Prior Publication Data

US 2026/0024139 A1 Jan. 22, 2026

Related U.S. Application Data

(60) Provisional application No. 63/709,863, filed on Oct. 21, 2024, provisional application No. 63/673,877, filed on Jul. 22, 2024.

(51) Int. Cl.
*G06Q 40/06* (2012.01)
*G06Q 20/38* (2012.01)
(Continued)

(52) U.S. Cl.
CPC ........... *G06Q 40/06* (2013.01); *G06Q 20/389* (2013.01); *G06Q 20/401* (2013.01); *G06Q 30/08* (2013.01); *G06Q 40/024* (2025.08)

(58) Field of Classification Search
CPC .... G06Q 40/06; G06Q 20/389; G06Q 20/401; G06Q 30/08; G06Q 40/024;
(Continued)

(56) References Cited

U.S. PATENT DOCUMENTS 12,271,898 B1 * 4/2025 Arvanaghi ............. G06Q 20/10
12,493,871 B1 * 12/2025 Vaniotis ............. G06Q 20/3672
(Continued)

*Primary Examiner* — Zeshan Qayyum
(74) *Attorney, Agent, or Firm* — GREENBERG TRAURIG LLP

(57) ABSTRACT

A method may include: receiving a request to deposit an encrypted amount of deposit tokens from an institutional investor; generating a stealth address for the institutional investor; encrypting claims for the institutional investor; posting the encrypted claims to an encrypted claims result smart contract, wherein the encrypted claims are mapped to the stealth address on a privacy-preserving blockchain; establishing the encrypted amount of deposit tokens on-chain at the stealth address; receiving an encrypted amount of a first fund and an encrypted amount of a second fund from the stealth address; and atomically transferring the encrypted amount of the first fund and the encrypted amount of the second fund to the stealth address, and deposit tokens for the encrypted amount of the first fund and the encrypted amount of the second fund to a fund manager for the first fund and a fund manager for the second fund, respectively.

13 Claims, 4 Drawing Sheets

(51) Int. Cl.
*G06Q 20/40* (2012.01)
*G06Q 30/08* (2012.01)
*G06Q 40/02* (2023.01)

(58) Field of Classification Search
CPC ........... G06Q 20/065; G06Q 20/38215; G06Q 20/383; G06Q 20/405; G06Q 40/04; H04L 2209/56; H04L 9/50
USPC ............................................................ 705/67
See application file for complete search history.

(56) References Cited

U.S. PATENT DOCUMENTS

2015/0356523 A1* 12/2015 Madden ............... G06Q 20/383
705/76
2024/0265375 A1* 8/2024 Haruna ................ G06Q 30/018
2025/0014099 A1* 1/2025 Dincoglu ............... G06Q 40/04
2025/0045751 A1* 2/2025 Minaei Bidgoli .... H04L 9/3247

* cited by examiner

DECENTRALIZED SYSTEMS AND METHODS FOR ENABLING INSTANTANEOUS SETTLEMENT WHILE MAINTAINING TRANSACTION PRIVACY AND ENSURING REGULATORY COMPLIANCE

RELATED APPLICATIONS

This application claims priority to, and the benefit of, U.S. Provisional Patent Application Ser. No. 63/673,877, filed Jul. 22, 2024, and of U.S. Provisional Patent Application Ser. No. 63/709,863 filed Oct. 21, 2024, the disclosure of each of which is hereby incorporated, by reference, in its entirety.

BACKGROUND OF THE INVENTION

1. Field of the Invention

Embodiments relate to decentralized systems and methods for enabling instantaneous settlement while maintaining transaction privacy and ensuring regulatory compliance.

2. Description of the Related Art

Digital Asset transfers on blockchain are transparent to any party running a node or with access to a block explorer. This means that for a network of banks, with each running one or more nodes, each bank can see the transactions between each of the other banks or parties. Without a scalable, flexible and compliant privacy solution, this construct does not allow for multiple competing entities to operate the network as peers. This reduces the benefits of blockchain decentralization.

Most privacy solutions are either not scalable for the financial use cases required of them, don't allow for appropriate regulatory disclosures and/or require additional trust assumptions which further dilutes the benefit of blockchain.

SUMMARY OF THE INVENTION

Decentralized systems and methods for enabling instantaneous settlement while maintaining transaction privacy and ensuring regulatory compliance are disclosed. In one embodiment, a method may include: receiving, by an identity and asset privacy service computer program communicating with a verifier service computer program, a request to deposit an encrypted amount of deposit tokens from an institutional investor, the request comprising a verifiable presentation; generating, by the verifier service computer program, a stealth address for the institutional investor, wherein the stealth address anonymizes contact information for the institutional investor; validating, by the verifier service computer program, the verifiable presentation using a digital identifier registry; encrypting, by the verifier service computer program, claims for the institutional investor; posting, by the verifier service computer program, the encrypted claims to an encrypted claims result smart contract, wherein the encrypted claims are mapped to the stealth address on a privacy-preserving blockchain; establishing, by an encrypted deposit token smart contract executed on the privacy-preserving blockchain, the encrypted amount of deposit tokens on-chain at the stealth address; receiving, by an encrypted fund token smart contract executed on the privacy-preserving blockchain, an encrypted amount of a first fund and an encrypted amount of a second fund from the stealth address; and atomically transferring, by the encrypted fund token smart contract, the encrypted amount of the first fund and the encrypted amount of the second fund to the stealth address, and deposit tokens for the encrypted amount of the first fund and the encrypted amount of the second fund to a fund manager for the first fund and a fund manager for the second fund, respectively.

In one embodiment, the privacy-preserving blockchain further may include an encrypted token smart contract and an associated unencrypted verifier rules contract for each of the first fund and the second fund.

In one embodiment, the associated unencrypted verifier rules contracts define on-chain requirements for the institutional investor.

In one embodiment, the on-chain requirements comprise an anti-money laundering requirement, a country requirement, and/or a sanctions check requirement.

In one embodiment, the claims comprise an anti-money laundering letter.

In one embodiment, the verifiable presentation may include a verifiable credential issued to the institutional investor.

In one embodiment, the encryption may be fully homomorphic encryption.

According to another embodiment, a method may include: receiving, by an identity and asset privacy service computer program communicating with a verifier service computer program and from an institutional investor, a request to sell an amount of tokens for a first fund on a secondary market, the request comprising a verifiable presentation for the institutional investor; generating, by the verifier service computer program, a stealth address for the institutional investor on a privacy-preserving blockchain, wherein the stealth address anonymizes contact information for the institutional investor; validating, by the verifier service computer program, the verifiable presentation using a digital identifier registry; encrypting, by the verifier service computer program, claims for the institutional investor; posting, by the verifier service computer program, the encrypted claims to an encrypted claims result smart contract, wherein the encrypted claims are mapped to the stealth address; placing, by an encrypted auction smart contract, the amount of tokens up for auction; receiving, by the encrypted auction smart contract, encrypted bids from a plurality of bidders, wherein each encrypted bid may include an encrypted bid amount and a stealth address for each bidder on the privacy-preserving blockchain; verifying, by the encrypted auction smart contract and using an unencrypted verifier rules contract, the stealth address for each bidder; selecting, by the encrypted auction smart contract, the encrypted bid having a highest amount; notifying, by the encrypted auction smart contract, the stealth address associated with the selected encrypted bid that its encrypted bid was selected; and atomically transferring, by the encrypted auction smart contract, the encrypted amount of the first fund to the stealth address associated with the selected encrypted bid, and an amount of the selected encrypted bid to the institutional investor.

In one embodiment, the privacy-preserving blockchain further may include an encrypted token smart contract and an associated unencrypted verifier rules contract for the first fund.

In one embodiment, the associated unencrypted verifier rules contracts define on-chain requirements for the bidders.

In one embodiment, the on-chain requirements comprise an anti-money laundering requirement, a country requirement, and/or a sanctions check requirement.

In one embodiment, the verifiable presentation may include a verifiable credential.

In one embodiment, the claims comprise an anti-money laundering letter.

In one embodiment, the encryption may be fully homomorphic encryption.

According to another embodiment, a system may include: an identity and asset privacy service computer program that may be configured to receive a request to deposit an encrypted amount of deposit tokens from an institutional investor, the request comprising a verifiable presentation; a verifier service computer program that may be configured to receive the request from the identity and asset privacy service computer program, to generate a stealth address for the institutional investor that anonymizes contact information for the institutional investor, to validate the verifiable presentation using a digital identifier registry, to encrypt claims for the institutional investor, to post the encrypted claims to an encrypted claims result smart contract, wherein the encrypted claims are mapped to the stealth address on a privacy-preserving blockchain; an encrypted deposit token smart contract on a privacy-preserving blockchain that may be configured to establish the encrypted amount of deposit tokens on-chain at the stealth address; an encrypted fund token smart contract on the privacy-preserving blockchain that may be configured to receive an encrypted amount of a first fund and an encrypted amount of a second fund from the stealth address, and to atomically transfer the encrypted amount of the first fund and the encrypted amount of the second fund to the stealth address, and deposit tokens for the encrypted amount of the first fund and the encrypted amount of the second fund to a fund manager for the first fund and a fund manager for the second fund, respectively.

In one embodiment, the privacy-preserving blockchain further may include an encrypted token smart contract and an associated unencrypted verifier rules contract for each of the first fund and the second fund, wherein the associated unencrypted verifier rules contracts define on-chain requirements for the institutional investor.

In one embodiment, the on-chain requirements comprise an anti-money laundering requirement, a country requirement, and/or a sanctions check requirement.

In one embodiment, the claims comprise an anti-money laundering letter.

In one embodiment, the verifiable presentation may include a verifiable credential issued to the institutional investor.

In one embodiment, the encryption may be fully homomorphic encryption.

BRIEF DESCRIPTION OF THE DRAWINGS

For a more complete understanding of the present invention, the objects, and advantages thereof, reference is now made to the following descriptions taken in connection with the accompanying drawings in which.

DETAILED DESCRIPTION OF PREFERRED EMBODIMENTS

Figure 1:
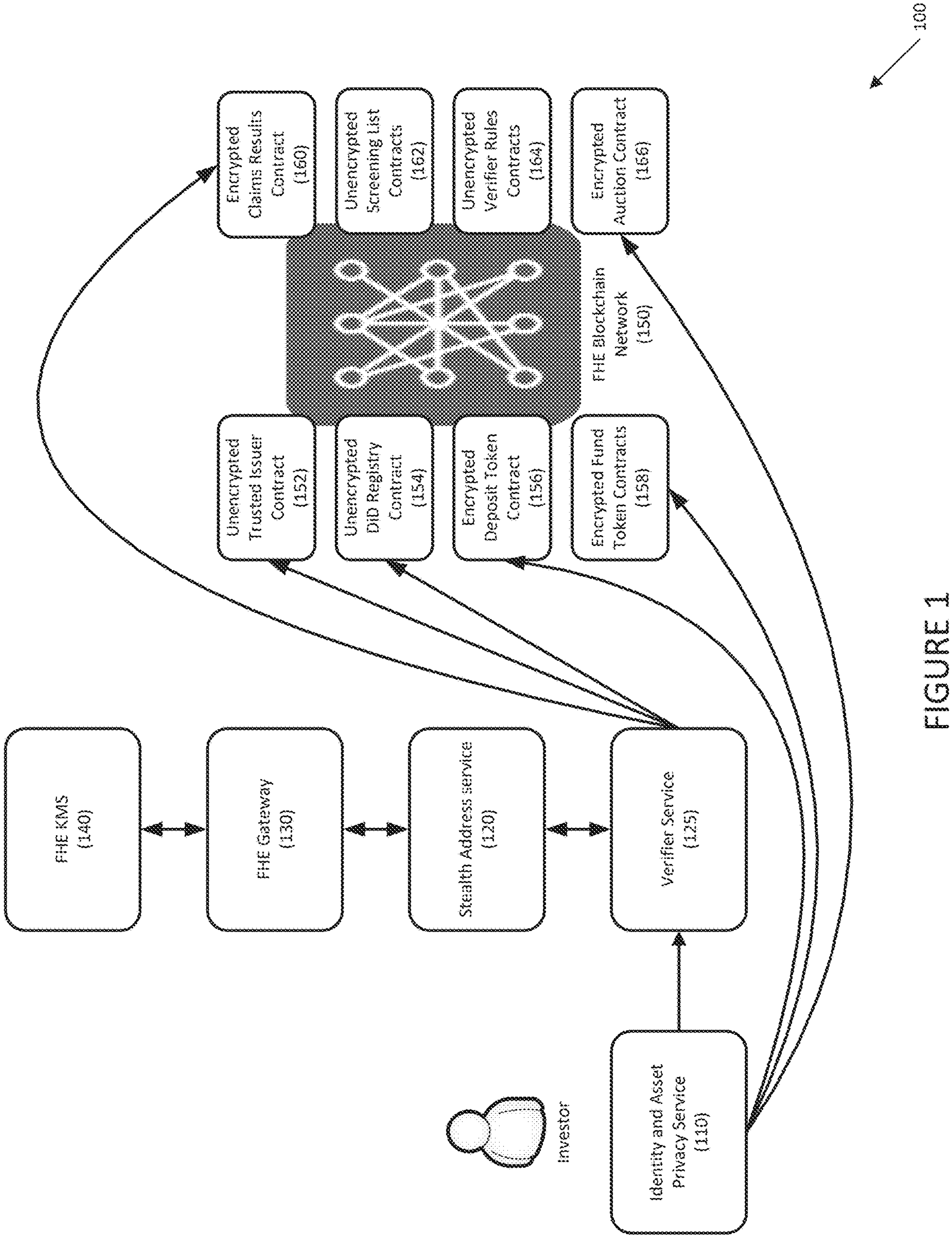
FIG. 1 illustrates a decentralized system for enabling instantaneous settlement while maintaining transaction privacy and ensuring regulatory compliance according to an embodiment.

Systems and methods for enabling instantaneous settlement while maintaining transaction privacy and ensuring regulatory compliance are disclosed.

The disclosure of U.S. Provisional Patent Application Ser. No. 63/706,480, filed Oct. 11, 2024, and of Greek patent application Ser. No. 20240100569, filed Aug. 13, 2024, are hereby incorporated, by reference, in their entireties.

Decentralized systems and methods for enabling instantaneous settlement while maintaining transaction privacy, user anonymity, and ensuring regulatory compliance and necessary identity checks are conducted without revealing private data.

Embodiments may provide a privacy solution by leveraging a combination and variants of ZKP (zero knowledge proof) for on-chain proof of off-chain computation, FHE (fully homomorphic encryption) for on-chain privacy (as needed), flooding transactions to hide the true asset type, sender, and receiver of a transfer by sending multiple encrypted zero transactions of different assets from and to different addresses, stealth addresses to enhance anonymity and MPC (multi-party computation) for key management.

Embodiments may deploy encrypted assets and cash tokens on-chain (inclusive of mint, burn, and transfer flows).

Embodiments may deploy encrypted fund token smart contracts.

Embodiments may deploy encrypted allowlists to flag sanctioned or unwanted assets or actors.

Embodiments may hide a type of token (e.g., the name and address) as well as addresses for the sender and the receiver by "flooding transactions"—sending multiple encrypted transactions of zero value of different tokens between different addresses. By flooding transactions, a viewer will not know which transaction has the asset type, sender, and receiver containing the true value of the transfer since the balances are encrypted. Embodiments may further hide transaction amounts and assets type as well using this technique.

Because the address used will change every time, embodiments may anonymize the from and to address through stealth addresses. In a ZKP-based transaction, the sender may be anonymized using, for example, a trusted relayer.

Embodiments may enable privacy-preserving programmatically defined selective disclosures allowing auditors and other specified entities to access specific smart contracts and granular parts of transaction details.

Embodiments may enable atomic delivery versus payment ("DvP") transactions in a privacy-preserving manner.

Embodiments may create a privacy wallet to store users' private data off chain and generate encrypted transactions or proofs.

Embodiments may use off-chain verifiable credentials linked to on-chain digital identities (or "DiDs") (by using on-chain Digital Identities to verify additional information of users during a transaction). Digital identities may be used to validate encrypted claims such as Know Your Customer ("KYC") status in a privacy-preserving manner.

Embodiments may deploy encrypted allowlists to flag sanctioned parties, which may be linked to the verifiable credential and/or digital identities.

Examples of digital identities are described in U.S. patent application Ser. No. 16/878,457 filed May 19, 2020, and U.S. Provisional Patent Application Ser. No. 62/850,18, filed May 20, 2019, the disclosures of which are hereby incorporated, by reference, in their entireties.

Embodiment may facilitate anonymous and confidential bids and order matching functionalities on-chain for primary fund subscription and secondary market trading.

Embodiment may ensure composability of assets to be used in additional use cases that get developed in a privacy-preserving manner.

In embodiments, the privacy, identity solutions, and the business flows may exist in separation and in some instances exist together, however, the summation of these technologies, along with the approach to selective disclosures, sanctions compliance, composability, privacy enabled atomic DvP, and privacy-preserving KYC and other identity compliance checks are unique.

Embodiments offer clients direct access to the blockchain and may allow clients and regulators to run nodes, thereby opening digital assets to a wider client through the improved cryptographic trust model.

The disclosures of U.S. Provisional Patent Application Ser. No. 63/489,500, U.S. patent application Ser. No. 18/601,763; U.S. Provisional Patent Application Ser. No. 63/512,256; U.S. patent application Ser. No. 18/765,842 are hereby incorporated, by reference, in their entireties.

In one embodiment, the digital wallets (may hold attestations as is described in U.S. patent application Ser. No. 17/174,650, U.S. Provisional Patent Application Ser. No. 62/976,262, and U.S. Provisional Patent Application Ser. No. 63/126,335, the disclosures of which are hereby incorporated, by reference, in their entireties.

Referring to FIG. 1, a decentralized system for enabling instantaneous settlement while maintaining transaction privacy and ensuring regulatory compliance is disclosed according to an embodiment. System 100 may include identity and asset privacy service 110 that may interface with verifier service 125, encrypted deposit token contract 156, encrypted fund token contracts 158, and encrypted auction contract 166. Users, such as investors, distributors, transfer agents, and cash agents may be provided with access to identity and asset privacy service 110 via their respective electronic devices (not shown). The users may provide a transaction involving a sender and a receiver.

The investor may be provided with a digital wallet (not shown).

Identity and asset privacy service 110 may interact with services that handle identity and asset logic (e.g., creating and managing stealth addresses, credentials, and interfacing with the blockchain (submit transactions, encrypt, decrypt)). A user interacts with it through their wallet UI and the logic can be abstracted from them.

Using stealth address service 120, identity and asset privacy service 110 may generate stealth addresses for the sender and the receiver. The stealth addresses may maintain the anonymity of the sender and the receiver.

Verifier service 125 may publish the stealth addresses and associated encrypted claims from the VC of an investor to encrypted claims results contract 160 on FHE blockchain network 150.

Stealth address service 120 may also listen for transactions or postings on encrypted claims results contract 160.

Identity and asset privacy service 110 may read encrypted contract data from encrypted deposit token contract 156 on FHE blockchain network 150, and, using FHE gateway 130, may decrypt and re-encrypt the contract data. Identity and asset privacy service 110 may also encrypt the transaction and submit the encrypted transaction to encrypted deposit token contract 156 and encrypted fund token contracts 158.

FHE blockchain network 150 may further provide, for example, one or more of encrypted deposit token contract 156 (e.g., to tokenize cash), unencrypted DiD registry contract 154 (e.g., to check the validity of VCs), encrypted fund token contracts 158 (e.g., to tokenize funds), unencrypted trusted issuer contract 152 (e.g., to serve as trust anchors for issuers of VCs), unencrypted screening list contracts 162 (e.g., for sanctions checks), unencrypted verifier rules contract 164 (e.g., defines on-chain requirements for investor eligibility for a fund), encrypted auction contract 166 (e.g., executes an auction), etc.

FHE Key Management System 140 may hold the keys necessary to encrypt and decrypt data.

Figure 2:
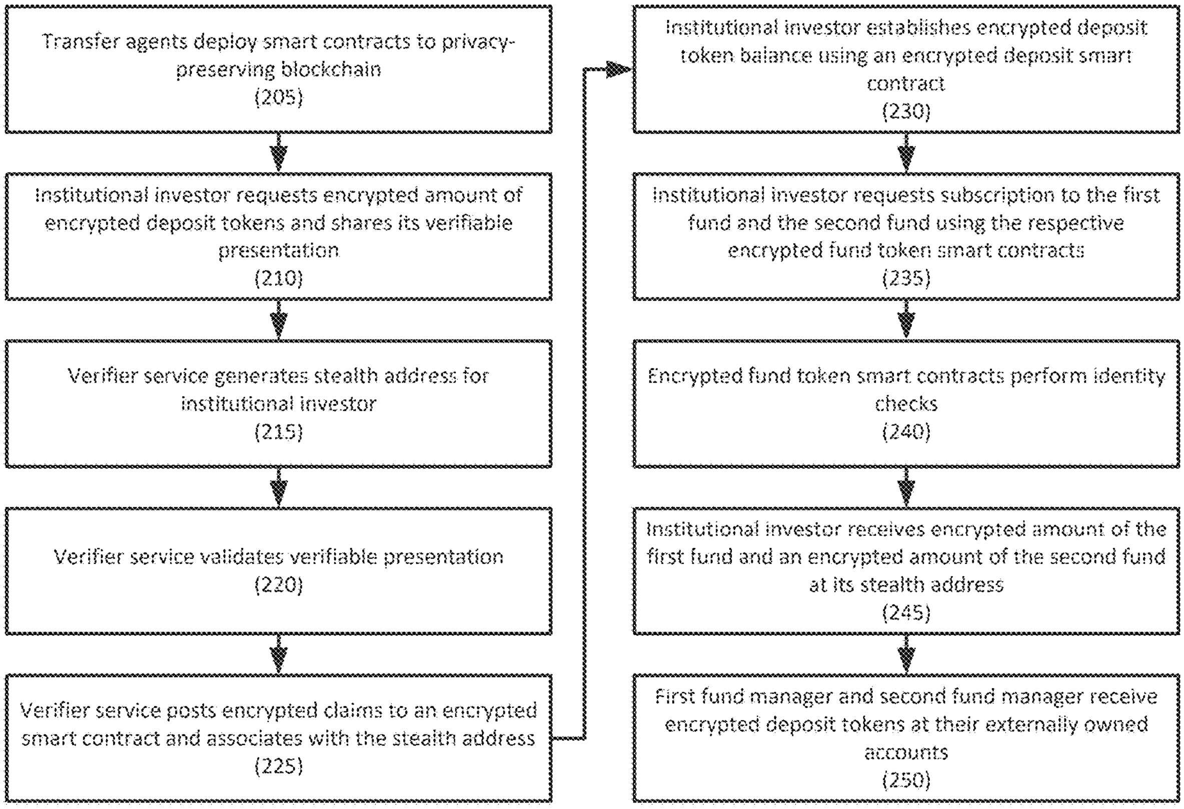
FIG. 2 illustrates a method for fund issuance and subscription while maintaining transaction privacy and ensuring regulatory compliance according to an embodiment.

Referring to FIG. 2, a method for fund issuance and subscription while maintaining transaction privacy and ensuring regulatory compliance is provided according to an embodiment.

In one embodiment, the operator of the network, such as a financial institution, may deploy contracts, such as an unencrypted decentralized identifier (DiD) registry contract, an unencrypted trusted issuers contract, an unencrypted screening list contract, and an encrypted claims result contract on a fully homomorphic encrypted (FHE)-Ethereum Virtual Machine (EVM)-enabled blockchain network. The unencrypted decentralized identifier (DiD) registry contract and unencrypted trusted issuers contract may be used as trust anchors for the issuance of verifiable credentials (VCs). The transfer agents, as trusted entities, may issue off-chain VCs to the institutional investors after performing necessary identity verification and AML checks.

In step 205, transfer agents may deploy encrypted fund token smart contracts to a privacy-preserving blockchain. For example, a first transfer agent may deploy an encrypted token smart contract and associated unencrypted verifier rules contract for a first fund on behalf of its fund manager on the privacy-preserving blockchain, and a second transfer agent may deploy an encrypted token smart contract and associated unencrypted verifier rules contract for a second fund on behalf of its fund manager on the privacy-enabled blockchain network. The unencrypted verifier rules contract defines the set of on-chain requirements that a transfer agent checks from an investor to ensure they are eligible to invest in the associated fund (e.g., Anti-Money Laundering, country, sanction checks, etc.). Both funds are then available for investors to subscribe to. An institutional investor's bank may deploy an encrypted deposit token contract on the privacy-preserving blockchain.

In step 210, the institutional investor may request an encrypted amount of deposit tokens from the bank that established the encrypted deposit tokens. The institutional investor may share a Verifiable Presentation (VP) which contains the previously issued Verifiable Credential and the associated claims (e.g., Anti-Money Laundering (AML) letter, investor country, etc.) to a trusted verifier service.

In step 215, the verifier service may generate a stealth address for the institutional investor using an off-chain stealth address service to maintain anonymity.

In step 220, the verifier services may validate the VP by checking the signatures of the presentation to ensure it came from the correct investor and the associated VC issuer DiD against the unencrypted DiD registry and unencrypted trusted issuers smart contracts to ensure the VC was issued by a trusted party. This may ensure that the VC belongs to the investor and was issued by a trusted party.

In step 225, after verifying the VP, the verifier service may encrypt and post the claims to the encrypted claims results smart contract. The encrypted claims may be mapped to, or associated with, the stealth address for the institutional investor.

In step 230, with the stealth address generated and the institutional investor address anonymized, the institutional investor may establish the encrypted deposit token balance on-chain through an encrypted deposit token smart contract. In one embodiment, the identity and asset privacy service may establish this balance using the encrypted deposit token smart contract.

In step 235, from the anonymous stealth address, the institutional investor may request a subscription of an encrypted amount of the first fund and an encrypted amount of the second fund using the respective encrypted fund token smart contracts.

In step 240, the encrypted fund token smart contracts may perform validity checks ahead of the investment of the fund to ensure the institutional investor is in compliance. For example, the respective encrypted fund token smart contracts for the funds may call their respective unencrypted verifier rules contracts, which homomorphically checks the encrypted claims results contract and unencrypted screening list contract to verify that the institutional investor's stealth address is valid and adheres to the rules defined by each fund's transfer agent in the unencrypted verifier rules contracts and the network rules in the unencrypted screening list contract.

In step 245, atomic Delivery versus Payment (DvP) may occur. First, for example, at its stealth address, the institutional investor receives an encrypted amount of the first fund and an encrypted amount of the second fund.

In one embodiment, DvP may be triggered after the verification in step 240 is performed.

At substantially the same time, in step 250, the first fund manager and the second fund manager may each receive an encrypted amount of deposit tokens at their externally owned accounts for the institutional investor's subscription into their respective funds.

Figure 3:
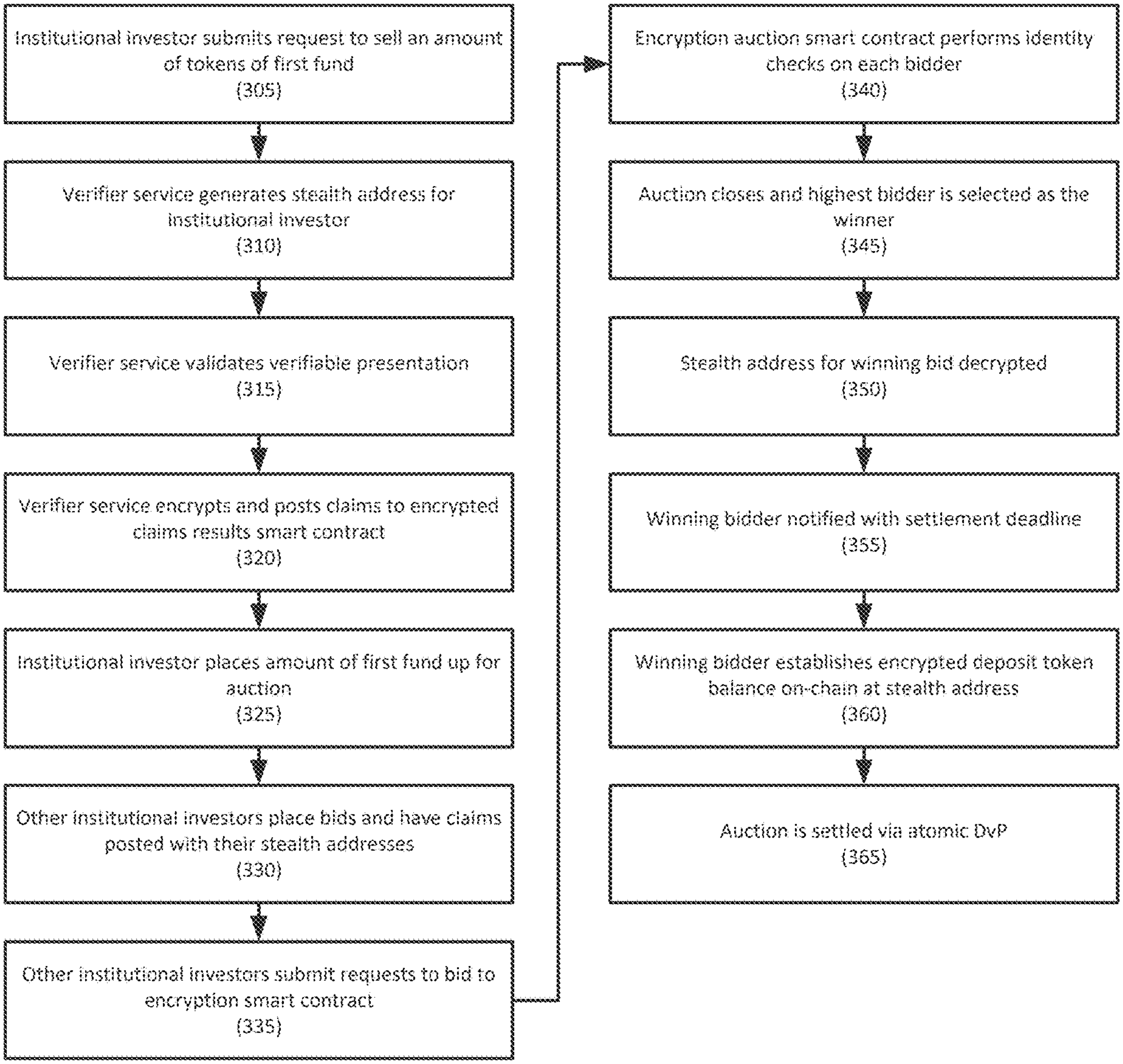
FIG. 3 illustrates a method for secondary market trading of funds while maintaining transaction privacy and ensuring regulatory compliance according to another embodiment.

Referring to FIG. 3, a method for secondary market trading of funds while maintaining transaction privacy and ensuring regulatory compliance is provided according to another embodiment.

In step 305, the institutional investor requests to sell an amount of previously purchased fund tokens for the first fund on a secondary market. The institutional investor may share a Verifiable Presentation (VP) which contains the previously issued Verifiable Credential and the associated claims (e.g., Anti-Money Laundering (AML) letter, investor country, etc.) to a trusted verifier service.

In step 310, the verifier service may generate a stealth address for the institutional investor using an off-chain stealth address service to maintain anonymity.

In step 315, the verifier services may validate the VP by checking the signatures of the presentation to ensure it came from the correct investor and the associated VC issuer DiD against the unencrypted DiD registry and unencrypted trusted issuers smart contracts to ensure the VC was issued by a trusted party.

In step 320, after verifying the VP, the verifier service may encrypt and may post the claims to the encrypted claims results smart contract.

In step 325, using the new stealth address, the institutional investor may place the amount of the first fund up for auction in an encrypted auction contract and sets a duration for the auction as well as a duration for the post auction closing settlement time to the encrypted auction smart contract.

In step 330, additional institutional investors (e.g., a second, third, and fourth institutional investor) may access a secondary market and may see the amount of the first fund that is for sale and place bids. For example, each of the first, second, and third institutional investors share their VPs and have stealth addresses generated with their specific encrypted claims added to the encrypted claims results contract.

In step 335, the additional institutional investors (e.g., bidders) may each submit a request to bid on the first fund to the encrypted auction smart contract where the highest verified bid will win. As an illustration, the second institutional investor may submit an encrypted bid of $5.2M of deposit tokens, the third institutional investor may submit an encrypted bid of $5M of deposit tokens, and the fourth institutional investor may submit an encrypted bid of $5.3M of deposit tokens.

In step 340, the encrypted auction smart contract may call the unencrypted verifier rules contract for the first fund to perform identity checks on each bidder. The unencrypted verifier rules contract may check the encrypted claims results contract and unencrypted screening list contract to homomorphically check that each bidder's stealth address is valid and adheres to the rules defined by the first funds transfer agent in the unencrypted verifier rules contracts and the network rules in the unencrypted screening list contract.

In one embodiment, the first funds transfer agent may check that the bidder has the proper credentials to be an investor of the fund, such as by checking the claims of the bidder against the unencrypted verifier rules contract and the encrypted claims results contract. If it meets, the bidder's bid is pushed through successfully. If not, the bid fails.

Continuing with the illustration, the second and third institutional investors' bids are accepted; because, however, the fourth institutional investor did not comply with the required fund rules that the first transfer agent required as their claim matched against the unencrypted screening list smart contract as sanctioned, the fourth institutional investor's bid is not placed.

In step 345, at the end of the specified auction duration, the auction is closed, and the highest bid is selected as winner.

In step 350, the encrypted winning stealth address may be decrypted as necessary by the operator of the network, but other defined entities may also call for decryption. The FHE KMS (which may be decentralized using multiparty computation, or MPC) may perform the decryption. It is also possible for re-encryption to occur whereby instead of decrypting the value, the value originally encrypted under the network FHE key is transformed into another value encrypted by a key provided by a user.

In step 355, at the stealth address, the winning institutional investor is notified that it won the auction and is provided with a settlement deadline to provide the winning bid. In the illustration, the second institutional investor is notified that it won the auction and of the settlement deadline to provide the encrypted $5.2M of deposit token to purchase the first fund.

In step 360, the winning bidder (e.g., the second institutional investor) may establish the encrypted deposit token balance on-chain through the encrypted deposit token smart contract to its stealth address prior to the settlement deadline.

In step 365, once the deposit token is funded by the winning bidder, the auction can be settled. For example, atomic DvP is conducted with the winning bidder receiving an encrypted amount of the first fund at its stealth address and the first institutional investor (the seller) receiving an encrypted amount of deposit tokens. The first fund manager (as fund manager of the first fund) may receive an encrypted royalty fee for the sale of their fund on the secondary market.

In one embodiment, instead of using stealth addresses, the identity of the investors may remain anonymous. For example, an investor may privately invest into the fund, and the fund may check the identity of the investor in a privacy-preserving manner.

Although embodiments are described in the context of fully homomorphic encryption, it should be recognized that other privacy solutions that might operate differently from a cryptographic perspective and flow may be used. For example, zero knowledge proofs may be used to provide privacy-preserving functionality.

Figure 4:
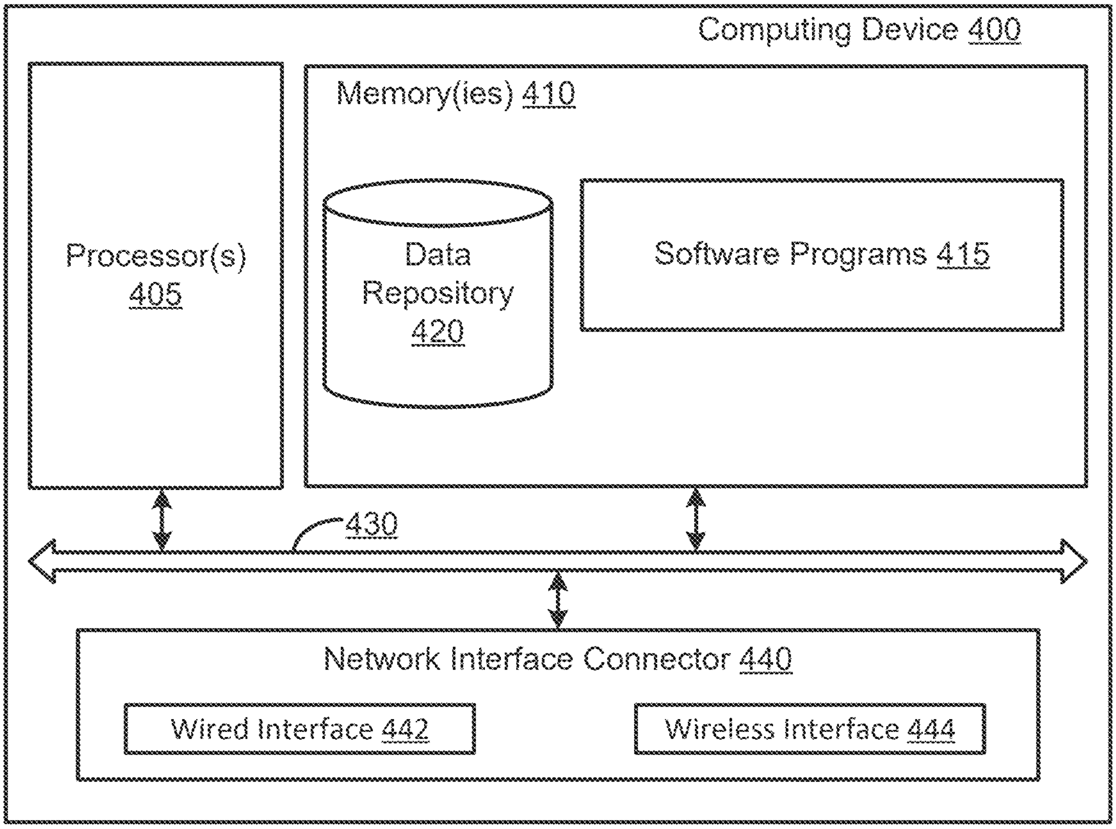
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by an identity and asset privacy service computer program communicating with a verifier service computer program, a request to deposit an encrypted amount of deposit tokens from an institutional investor, the request comprising a verifiable presentation;

generating, by the verifier service computer program, a stealth address for the institutional investor, wherein the stealth address anonymizes contact information for the institutional investor;

validating, by the verifier service computer program, the verifiable presentation using a digital identifier registry;

encrypting, by the verifier service computer program, claims for the institutional investor;

posting, by the verifier service computer program, the encrypted claims to an encrypted claims result smart contract, wherein the encrypted claims are mapped to the stealth address on a privacy-preserving blockchain;

establishing, by an encrypted deposit token smart contract executed on the privacy-preserving blockchain, the encrypted amount of deposit tokens on-chain at the stealth address;

receiving, by an encrypted fund token smart contract executed on the privacy-preserving blockchain, an encrypted amount of a first fund and an encrypted amount of a second fund from the stealth address; and atomically transferring, by the encrypted fund token smart contract, the encrypted amount of the first fund and the encrypted amount of the second fund to the stealth address, and deposit tokens for the encrypted amount of the first fund and the encrypted amount of the second fund to a fund manager for the first fund and a fund manager for the second fund, respectively.

2. The method of claim 1, wherein the privacy-preserving blockchain further comprises an encrypted token smart contract and an associated unencrypted verifier rules contract for each of the first fund and the second fund.

3. The method of claim 2, wherein the associated unencrypted verifier rules contracts define on-chain requirements for the institutional investor.

4. The method of claim 3, wherein the on-chain requirements comprise an anti-money laundering requirement, a country requirement, and/or a sanctions check requirement.

5. The method of claim 1, wherein the claims comprise an anti-money laundering letter.

6. The method of claim 1, wherein the verifiable presentation comprises a verifiable credential issued to the institutional investor.

7. The method of claim 1, wherein the encryption is fully homomorphic encryption.

8. A system, comprising:

a first computer comprising a first memory and a first processor, wherein the first memory storing an identity and asset privacy service computer program and a verifier service computer program, the first processor executing the identity and asset privacy service computer program to perform functions of:

receiving a request to deposit an encrypted amount of deposit tokens from an institutional investor, the request comprising a verifiable presentation;

the first processor further executing the verifier service computer program to perform functions of:

receiving the request from the identity and asset privacy service computer program;

generating a stealth address for the institutional investor that anonymizes contact information for the institutional investor;

validating the verifiable presentation using a digital identifier registry;

encrypting claims for the institutional investor;

posting the encrypted claims to an encrypted claims result smart contract, wherein the encrypted claims are mapped to the stealth address on a privacy-preserving blockchain;

a second computer comprising a second memory and a second processor, wherein the second memory storing the privacy-preserving blockchain comprising an encrypted deposit token smart contract and an encrypted fund token smart contract, the second processor executing the encrypted deposit token smart contract to perform functions of:

establishing the encrypted amount of deposit tokens on-chain at the stealth address;

the second processor further executing an encrypted fund token smart contract to perform functions of:

receiving an encrypted amount of a first fund and an encrypted amount of a second fund from the stealth address; and atomically transferring the encrypted amount of the first fund and the encrypted amount of the second fund to the stealth address, and deposit tokens for the encrypted amount of the first fund and the encrypted amount of the second fund to a fund manager for the first fund and a fund manager for the second fund, respectively.

9. The system of claim 8, wherein the privacy-preserving blockchain further comprises an encrypted token smart contract and an associated unencrypted verifier rules contract for each of the first fund and the second fund, wherein the associated unencrypted verifier rules contracts define on-chain requirements for the institutional investor.

10. The system of claim 9, wherein the on-chain requirements comprise an anti-money laundering requirement, a country requirement, and/or a sanctions check requirement.

11. The system of claim 8, wherein the claims comprise an anti-money laundering letter.

12. The system of claim 8, wherein the verifiable presentation comprises a verifiable credential issued to the institutional investor.

13. The system of claim 8, wherein the encryption is fully homomorphic encryption.

* * * * *